United States Patent [19]
Phelps et al.

[11] Patent Number: 5,175,862
[45] Date of Patent: Dec. 29, 1992

[54] METHOD AND APPARATUS FOR A SPECIAL PURPOSE ARITHMETIC BOOLEAN UNIT

[75] Inventors: Andrew E. Phelps, Eau claire; Douglas R. Beard, Eleva; Michael A. Woodsmansee, Eau Claire, all of Wis.

[73] Assignee: Supercomputer Systems Limited Partnership, Eau Claire, Wis.

[21] Appl. No.: 536,197

[22] Filed: Jun. 11, 1990

Related U.S. Application Data

[63] Continuation-in-part of Ser. No. 459,083, Dec. 29, 1989.

[51] Int. Cl.[5] .............................................. G06F 15/16
[52] U.S. Cl. ................... 395/800; 364/931.4; 364/947.1; 364/259.1; 364/231.9
[58] Field of Search ................ 395/800 MS File; 364/521, 730, 736, 738, 716

[56] References Cited

U.S. PATENT DOCUMENTS

| | | | |
|---|---|---|---|
| 3,308,436 | 3/1967 | Borck | 364/200 |
| 3,364,472 | 1/1968 | Sloper | 364/200 |
| 4,034,354 | 7/1977 | Simmons | 364/200 |
| 4,081,860 | 3/1978 | Miller | 364/738 |
| 4,084,252 | 4/1978 | Miller | 364/738 |
| 4,150,434 | 4/1979 | Shibayama | 364/736 |
| 4,287,566 | 9/1981 | Culler | 364/754 |
| 4,380,046 | 4/1983 | Frosch | 364/200 |
| 4,546,433 | 10/1985 | Tucker | 364/900 |
| 4,601,055 | 7/1986 | Kent | 364/900 |
| 4,633,389 | 12/1986 | Tanaka | 364/200 |
| 4,645,953 | 2/1987 | Wong | 364/716 |
| 4,648,045 | 3/1987 | Demetrescu | 364/521 |
| 4,730,130 | 3/1988 | Baskett | 307/466 |
| 4,956,801 | 9/1990 | Priem et al. | 364/748 |
| 5,038,312 | 8/1991 | Kojima | 364/730 |
| 5,058,001 | 10/1991 | Li | 364/200 |

Primary Examiner—David Y. Eng
Attorney, Agent, or Firm—Patterson & Keough

[57] ABSTRACT

A special purpose arithmetic boolean unit is capable of performing extremely parallel bit-level boolean operations, particularly bit matrix manipulations. The special purpose arithmetic boolean unit is especially adapted for use in traditional vector processors, thereby enabling a vector processor to effectively solve extremely parallel MIMD or SIMD boolean problems without requiring an array processor or massively parallel supercomputer.

18 Claims, 13 Drawing Sheets

Fig.4a

| LOADED UNIT | 0<br>0<br>0<br>⋮<br>0<br>0<br>1 | 0<br>0<br>0<br>⋮<br>0<br>1<br>0 | 0<br>0<br>0<br>⋮<br>1<br>0<br>0 | . . . | 0<br>0<br>1<br>⋮<br>0<br>0<br>0 | 0<br>1<br>0<br>⋮<br>0<br>0<br>0 | 1<br>0<br>0<br>⋮<br>0<br>0<br>0 |
|---|---|---|---|---|---|---|---|
| INPUT VECTOR | $e_{0.63}$<br>$e_{1.63}$<br>$e_{2.63}$<br>⋮<br>$e_{61.63}$<br>$e_{62.63}$<br>$e_{63.63}$ | $e_{0.62}$<br>$e_{1.62}$<br>$e_{2.62}$<br>⋮<br>$e_{61.62}$<br>$e_{62.62}$<br>$e_{63.62}$ | $e_{0.61}$<br>$e_{1.61}$<br>$e_{2.61}$<br>⋮<br>$e_{61.61}$<br>$e_{62.61}$<br>$e_{63.61}$ | . . . | $e_{0.02}$<br>$e_{1.02}$<br>$e_{2.02}$<br>⋮<br>$e_{61.02}$<br>$e_{62.02}$<br>$e_{63.02}$ | $e_{0.01}$<br>$e_{1.01}$<br>$e_{2.01}$<br>⋮<br>$e_{61.01}$<br>$e_{62.01}$<br>$e_{63.01}$ | $e_{0.00}$<br>$e_{1.00}$<br>$e_{2.00}$<br>⋮<br>$e_{61.00}$<br>$e_{62.00}$<br>$e_{63.00}$ |
| OUTPUT VECTOR | $e_{0.63}$<br>$e_{1.63}$<br>$e_{2.63}$<br>⋮<br>$e_{61.63}$<br>$e_{62.63}$<br>$e_{63.63}$ | $e_{0.62}$<br>$e_{1.62}$<br>$e_{2.62}$<br>⋮<br>$e_{61.62}$<br>$e_{62.62}$<br>$e_{63.62}$ | $e_{0.61}$<br>$e_{1.61}$<br>$e_{2.61}$<br>⋮<br>$e_{61.61}$<br>$e_{62.61}$<br>$e_{63.61}$ | . . . | $e_{0.02}$<br>$e_{1.02}$<br>$e_{2.02}$<br>⋮<br>$e_{61.02}$<br>$e_{62.02}$<br>$e_{63.02}$ | $e_{0.01}$<br>$e_{1.01}$<br>$e_{2.01}$<br>⋮<br>$e_{61.01}$<br>$e_{62.01}$<br>$e_{63.01}$ | $e_{0.00}$<br>$e_{1.00}$<br>$e_{2.00}$<br>⋮<br>$e_{61.00}$<br>$e_{62.00}$<br>$e_{63.00}$ |

Fig.4b

| | | | | | | | |
|---|---|---|---|---|---|---|---|
| LOADED UNIT | 1<br>0<br>0<br>⋮<br>0<br>0<br>0 | 0<br>1<br>0<br>⋮<br>0<br>0<br>0 | 0<br>0<br>1<br>⋮<br>0<br>0<br>0 | · · · | 0<br>0<br>0<br>⋮<br>1<br>0<br>0 | 0<br>0<br>0<br>⋮<br>0<br>1<br>0 | 0<br>0<br>0<br>⋮<br>0<br>0<br>1 |
| INPUT VECTOR | $e_{0.63}$<br>$e_{1.63}$<br>$e_{2.63}$<br>⋮<br>$e_{61.63}$<br>$e_{62.63}$<br>$e_{63.63}$ | $e_{0.62}$<br>$e_{1.62}$<br>$e_{2.62}$<br>⋮<br>$e_{61.62}$<br>$e_{62.62}$<br>$e_{63.62}$ | $e_{0.61}$<br>$e_{1.61}$<br>$e_{2.61}$<br>⋮<br>$e_{61.61}$<br>$e_{62.61}$<br>$e_{63.61}$ | · · · | $e_{0.02}$<br>$e_{1.02}$<br>$e_{2.02}$<br>⋮<br>$e_{61.02}$<br>$e_{62.02}$<br>$e_{63.02}$ | $e_{0.01}$<br>$e_{1.01}$<br>$e_{2.01}$<br>⋮<br>$e_{61.01}$<br>$e_{62.01}$<br>$e_{63.01}$ | $e_{0.00}$<br>$e_{1.00}$<br>$e_{2.00}$<br>⋮<br>$e_{61.00}$<br>$e_{62.00}$<br>$e_{63.00}$ |
| OUTPUT VECTOR | $e_{0.00}$<br>$e_{1.00}$<br>$e_{2.00}$<br>⋮<br>$e_{61.00}$<br>$e_{62.00}$<br>$e_{63.00}$ | $e_{0.01}$<br>$e_{1.01}$<br>$e_{2.01}$<br>⋮<br>$e_{61.01}$<br>$e_{62.01}$<br>$e_{63.01}$ | $e_{0.02}$<br>$e_{1.02}$<br>$e_{2.02}$<br>⋮<br>$e_{61.02}$<br>$e_{62.02}$<br>$e_{63.02}$ | · · · | $e_{0.61}$<br>$e_{1.61}$<br>$e_{2.61}$<br>⋮<br>$e_{61.61}$<br>$e_{62.61}$<br>$e_{63.61}$ | $e_{0.62}$<br>$e_{1.62}$<br>$e_{2.62}$<br>⋮<br>$e_{61.62}$<br>$e_{62.62}$<br>$e_{63.62}$ | $e_{0.63}$<br>$e_{1.63}$<br>$e_{2.63}$<br>⋮<br>$e_{61.63}$<br>$e_{62.63}$<br>$e_{63.63}$ |

Fig.4c

| | | | | | | | |
|---|---|---|---|---|---|---|---|
| LOADED UNIT | 0 | 0 | 0 | . . . | 0 | 0 | 0 |
| | 0 | 0 | 0 | . . . | 0 | 0 | 0 |
| | 0 | 0 | 0 | . . . | 1 | 0 | 0 |
| | : | : | : | | : | : | : |
| | 0 | 0 | 1 | . . . | 0 | 0 | 0 |
| | 0 | 1 | 0 | . . . | 0 | 0 | 0 |
| | 0 | 0 | 0 | . . . | 0 | 0 | 0 |
| INPUT VECTOR | $e_{0.63}$ | $e_{0.62}$ | $e_{0.61}$ | . . . | $e_{0.02}$ | $e_{0.01}$ | $e_{0.00}$ |
| | $e_{1.63}$ | $e_{1.62}$ | $e_{1.61}$ | . . . | $e_{1.02}$ | $e_{1.01}$ | $e_{1.00}$ |
| | $e_{2.63}$ | $e_{2.62}$ | $e_{2.61}$ | . . . | $e_{2.02}$ | $e_{2.01}$ | $e_{2.00}$ |
| | : | : | : | | : | : | : |
| | $e_{61.63}$ | $e_{61.62}$ | $e_{61.61}$ | . . . | $e_{61.02}$ | $e_{61.01}$ | $e_{61.00}$ |
| | $e_{62.63}$ | $e_{62.62}$ | $e_{62.61}$ | . . . | $e_{62.02}$ | $e_{62.01}$ | $e_{62.00}$ |
| | $e_{63.63}$ | $e_{63.62}$ | $e_{63.61}$ | . . . | $e_{63.02}$ | $e_{63.01}$ | $e_{63.00}$ |
| OUTPUT VECTOR | 0 | $e_{0.62}$ | $e_{0.61}$ | . . . | $e_{0.02}$ | 0 | 0 |
| | 0 | $e_{1.62}$ | $e_{1.61}$ | . . . | $e_{1.02}$ | 0 | 0 |
| | 0 | $e_{2.62}$ | $e_{2.61}$ | . . . | $e_{2.02}$ | 0 | 0 |
| | : | : | : | | : | : | : |
| | 0 | $e_{61.62}$ | $e_{61.61}$ | . . . | $e_{61.02}$ | 0 | 0 |
| | 0 | $e_{62.62}$ | $e_{62.61}$ | . . . | $e_{62.02}$ | 0 | 0 |
| | 0 | $e_{63.62}$ | $e_{63.61}$ | . . . | $e_{63.02}$ | 0 | 0 |

Fig.4d

| | | | | | | | |
|---|---|---|---|---|---|---|---|
| LOADED UNIT | 0 | 0 | 0 | ... | 0 | 1 | 0 |
| | 0 | 0 | 0 | ... | 1 | 0 | 0 |
| | 0 | 0 | 0 | ... | 0 | 0 | 0 |
| | ⋮ | ⋮ | ⋮ | | ⋮ | ⋮ | ⋮ |
| | 0 | 1 | 0 | ... | 0 | 0 | 0 |
| | 1 | 0 | 0 | ... | 0 | 0 | 0 |
| | 0 | 0 | 0 | ... | 0 | 0 | 0 |

| | | | | | | | |
|---|---|---|---|---|---|---|---|
| INPUT VECTOR | $e_{0.63}$ | $e_{0.62}$ | $e_{0.61}$ | ... | $e_{0.02}$ | $e_{0.01}$ | $e_{0.00}$ |
| | $e_{1.63}$ | $e_{1.62}$ | $e_{1.61}$ | ... | $e_{1.02}$ | $e_{1.01}$ | $e_{1.00}$ |
| | $e_{2.63}$ | $e_{2.62}$ | $e_{2.61}$ | ... | $e_{2.02}$ | $e_{2.01}$ | $e_{2.00}$ |
| | ⋮ | ⋮ | ⋮ | | ⋮ | ⋮ | ⋮ |
| | $e_{61.63}$ | $e_{61.62}$ | $e_{61.61}$ | ... | $e_{61.02}$ | $e_{61.01}$ | $e_{61.00}$ |
| | $e_{62.63}$ | $e_{62.62}$ | $e_{62.61}$ | ... | $e_{62.02}$ | $e_{62.01}$ | $e_{62.00}$ |
| | $e_{63.63}$ | $e_{63.62}$ | $e_{63.61}$ | ... | $e_{63.02}$ | $e_{63.01}$ | $e_{63.00}$ |

| | | | | | | | |
|---|---|---|---|---|---|---|---|
| OUTPUT VECTOR | 0 | $e_{0.63}$ | $e_{0.62}$ | ... | $e_{0.03}$ | $e_{0.02}$ | $e_{0.01}$ |
| | 0 | $e_{1.63}$ | $e_{1.62}$ | ... | $e_{1.03}$ | $e_{1.02}$ | $e_{1.01}$ |
| | 0 | $e_{2.63}$ | $e_{2.62}$ | ... | $e_{2.03}$ | $e_{2.02}$ | $e_{2.01}$ |
| | ⋮ | ⋮ | ⋮ | | ⋮ | ⋮ | ⋮ |
| | 0 | $e_{61.63}$ | $e_{61.62}$ | ... | $e_{61.03}$ | $e_{61.02}$ | $e_{61.01}$ |
| | 0 | $e_{62.63}$ | $e_{62.62}$ | ... | $e_{62.03}$ | $e_{62.02}$ | $e_{62.01}$ |
| | 0 | $e_{63.63}$ | $e_{63.62}$ | ... | $e_{63.03}$ | $e_{63.02}$ | $e_{63.01}$ |

Fig.4e

| LOADED UNIT | 0 | 0 | 1 | ... | 0 | 0 | 0 |
|---|---|---|---|---|---|---|---|
| | 0 | 0 | 0 | ... | 0 | 1 | 0 |
| | 0 | 0 | 0 | ... | 0 | 0 | 1 |
| | ⋮ | ⋮ | ⋮ | | ⋮ | ⋮ | ⋮ |
| | 1 | 0 | 0 | ... | 0 | 0 | 0 |
| | 0 | 0 | 0 | ... | 1 | 0 | 0 |
| | 0 | 1 | 0 | ... | 0 | 0 | 0 |

| INPUT VECTOR | $e_{0.63}$ | $e_{0.62}$ | $e_{0.61}$ | ... | $e_{0.02}$ | $e_{0.01}$ | $e_{0.00}$ |
|---|---|---|---|---|---|---|---|
| | $e_{1.63}$ | $e_{1.62}$ | $e_{1.61}$ | ... | $e_{1.02}$ | $e_{1.01}$ | $e_{1.00}$ |
| | $e_{2.63}$ | $e_{2.62}$ | $e_{2.61}$ | ... | $e_{2.02}$ | $e_{2.01}$ | $e_{2.00}$ |
| | ⋮ | ⋮ | ⋮ | | ⋮ | ⋮ | ⋮ |
| | $e_{61.63}$ | $e_{61.62}$ | $e_{61.61}$ | ... | $e_{61.02}$ | $e_{61.01}$ | $e_{61.00}$ |
| | $e_{62.63}$ | $e_{62.62}$ | $e_{62.61}$ | ... | $e_{62.02}$ | $e_{62.01}$ | $e_{62.00}$ |
| | $e_{63.63}$ | $e_{63.62}$ | $e_{63.61}$ | ... | $e_{63.02}$ | $e_{63.01}$ | $e_{63.00}$ |

| OUTPUT VECTOR | $e_{0.62}$ | $e_{0.02}$ | $e_{0.63}$ | ... | $e_{0.00}$ | $e_{0.01}$ | $e_{0.61}$ |
|---|---|---|---|---|---|---|---|
| | $e_{1.62}$ | $e_{1.02}$ | $e_{1.63}$ | ... | $e_{1.00}$ | $e_{1.01}$ | $e_{1.61}$ |
| | $e_{2.62}$ | $e_{2.02}$ | $e_{2.63}$ | ... | $e_{2.00}$ | $e_{2.01}$ | $e_{2.61}$ |
| | ⋮ | ⋮ | ⋮ | | ⋮ | ⋮ | ⋮ |
| | $e_{61.62}$ | $e_{61.02}$ | $e_{61.63}$ | ... | $e_{61.00}$ | $e_{61.01}$ | $e_{61.61}$ |
| | $e_{62.62}$ | $e_{62.02}$ | $e_{62.63}$ | ... | $e_{62.00}$ | $e_{62.01}$ | $e_{62.61}$ |
| | $e_{63.62}$ | $e_{63.02}$ | $e_{63.63}$ | ... | $e_{63.00}$ | $e_{63.01}$ | $e_{63.61}$ |

Fig.4f

| LOADED UNIT | $e_{0.63}$ | $e_{0.62}$ | $e_{0.61}$ | · · · | $e_{0.02}$ | $e_{0.01}$ | $e_{0.00}$ |
|---|---|---|---|---|---|---|---|
| | $e_{1.63}$ | $e_{1.62}$ | $e_{1.61}$ | · · · | $e_{1.02}$ | $e_{1.01}$ | $e_{1.00}$ |
| | $e_{2.63}$ | $e_{2.62}$ | $e_{2.61}$ | · · · | $e_{2.02}$ | $e_{2.01}$ | $e_{2.00}$ |
| | ⋮ | ⋮ | ⋮ | | ⋮ | ⋮ | ⋮ |
| | $e_{61.63}$ | $e_{61.62}$ | $e_{61.61}$ | · · · | $e_{61.02}$ | $e_{61.01}$ | $e_{61.00}$ |
| | $e_{62.63}$ | $e_{62.62}$ | $e_{62.61}$ | · · · | $e_{62.02}$ | $e_{62.01}$ | $e_{62.00}$ |
| | $e_{63.63}$ | $e_{63.62}$ | $e_{63.61}$ | · · · | $e_{63.02}$ | $e_{63.01}$ | $e_{63.00}$ |
| INPUT VECTOR | 1 | 0 | 0 | · · · | 0 | 0 | 0 |
| | 0 | 1 | 0 | · · · | 0 | 0 | 0 |
| | 0 | 0 | 1 | · · · | 0 | 0 | 0 |
| | ⋮ | ⋮ | ⋮ | | ⋮ | ⋮ | ⋮ |
| | 0 | 0 | 0 | · · · | 1 | 0 | 0 |
| | 0 | 0 | 0 | · · · | 0 | 1 | 0 |
| | 0 | 0 | 0 | · · · | 0 | 0 | 1 |
| OUTPUT VECTOR | $e_{63.63}$ | $e_{62.63}$ | $e_{61.63}$ | · · · | $e_{2.63}$ | $e_{1.63}$ | $e_{0.63}$ |
| | $e_{63.62}$ | $e_{62.62}$ | $e_{61.62}$ | · · · | $e_{2.62}$ | $e_{1.62}$ | $e_{0.62}$ |
| | $e_{63.61}$ | $e_{62.61}$ | $e_{61.61}$ | · · · | $e_{2.61}$ | $e_{1.61}$ | $e_{0.61}$ |
| | ⋮ | ⋮ | ⋮ | | ⋮ | ⋮ | ⋮ |
| | $e_{63.02}$ | $e_{62.02}$ | $e_{61.02}$ | · · · | $e_{2.02}$ | $e_{1.02}$ | $e_{0.02}$ |
| | $e_{63.01}$ | $e_{62.01}$ | $e_{61.01}$ | · · · | $e_{2.01}$ | $e_{2.01}$ | $e_{0.01}$ |
| | $e_{63.00}$ | $e_{62.00}$ | $e_{61.00}$ | · · · | $e_{2.00}$ | $e_{3.00}$ | $e_{0.00}$ |

Fig.4g

| | | | | | | | |
|---|---|---|---|---|---|---|---|
| LOADED UNIT | $e_{0.63}$ | $e_{0.62}$ | $e_{0.61}$ | ... | $e_{0.02}$ | $e_{0.01}$ | $e_{0.00}$ |
| | $e_{1.63}$ | $e_{1.62}$ | $e_{1.61}$ | ... | $e_{1.02}$ | $e_{1.01}$ | $e_{1.00}$ |
| | $e_{2.63}$ | $e_{2.62}$ | $e_{2.61}$ | ... | $e_{2.02}$ | $e_{2.01}$ | $e_{2.00}$ |
| | $\vdots$ | $\vdots$ | $\vdots$ | | $\vdots$ | $\vdots$ | $\vdots$ |
| | $e_{61.63}$ | $e_{61.62}$ | $e_{61.61}$ | ... | $e_{61.02}$ | $e_{61.01}$ | $e_{61.00}$ |
| | $e_{62.63}$ | $e_{62.62}$ | $e_{62.61}$ | ... | $e_{62.02}$ | $e_{62.01}$ | $e_{62.00}$ |
| | $e_{63.63}$ | $e_{63.62}$ | $e_{63.61}$ | ... | $e_{63.02}$ | $e_{63.01}$ | $e_{63.00}$ |
| INPUT VECTOR | 0 | 0 | 0 | ... | 0 | 0 | 1 |
| | 0 | 0 | 0 | ... | 0 | 1 | 0 |
| | 0 | 0 | 0 | ... | 1 | 0 | 0 |
| | $\vdots$ | $\vdots$ | $\vdots$ | | $\vdots$ | $\vdots$ | $\vdots$ |
| | 0 | 0 | 1 | ... | 0 | 0 | 0 |
| | 0 | 1 | 0 | ... | 0 | 0 | 0 |
| | 1 | 0 | 0 | ... | 0 | 0 | 0 |
| OUTPUT VECTOR | $e_{63.00}$ | $e_{62.00}$ | $e_{61.00}$ | ... | $e_{2.00}$ | $e_{1.00}$ | $e_{0.00}$ |
| | $e_{63.01}$ | $e_{62.01}$ | $e_{61.01}$ | ... | $e_{2.01}$ | $e_{1.01}$ | $e_{0.01}$ |
| | $e_{63.02}$ | $e_{62.02}$ | $e_{61.02}$ | ... | $e_{2.02}$ | $e_{1.02}$ | $e_{0.02}$ |
| | $\vdots$ | $\vdots$ | $\vdots$ | | $\vdots$ | $\vdots$ | $\vdots$ |
| | $e_{63.61}$ | $e_{62.61}$ | $e_{61.61}$ | ... | $e_{2.61}$ | $e_{1.61}$ | $e_{0.61}$ |
| | $e_{63.62}$ | $e_{62.62}$ | $e_{61.62}$ | ... | $e_{2.62}$ | $e_{2.62}$ | $e_{0.62}$ |
| | $e_{63.63}$ | $e_{62.63}$ | $e_{61.63}$ | ... | $e_{2.63}$ | $e_{3.63}$ | $e_{0.63}$ |

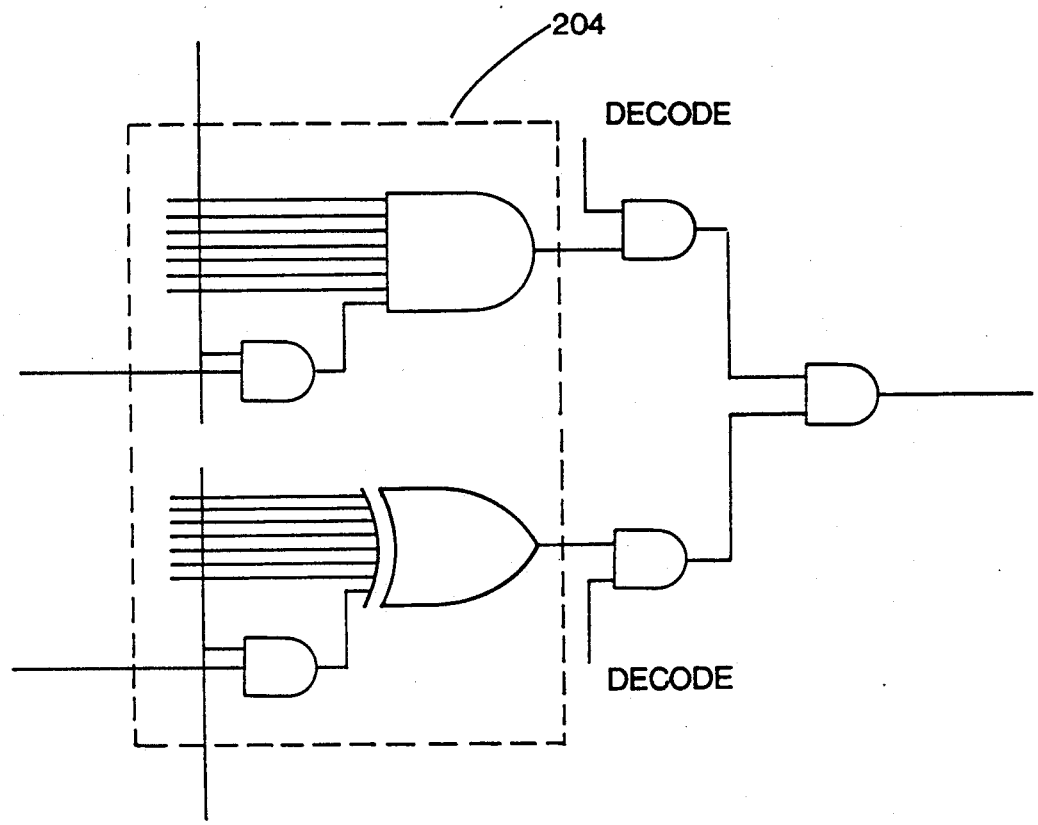

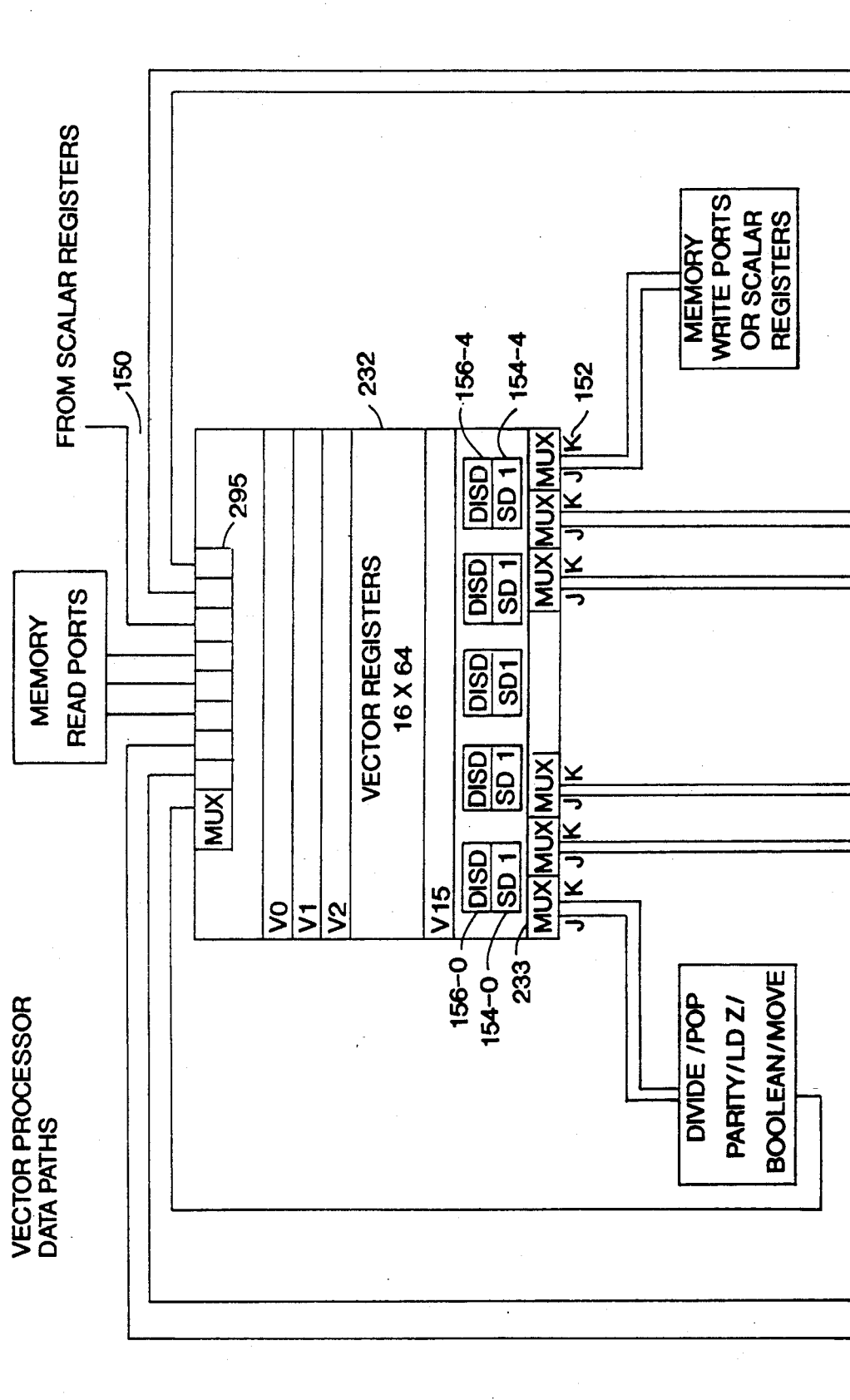

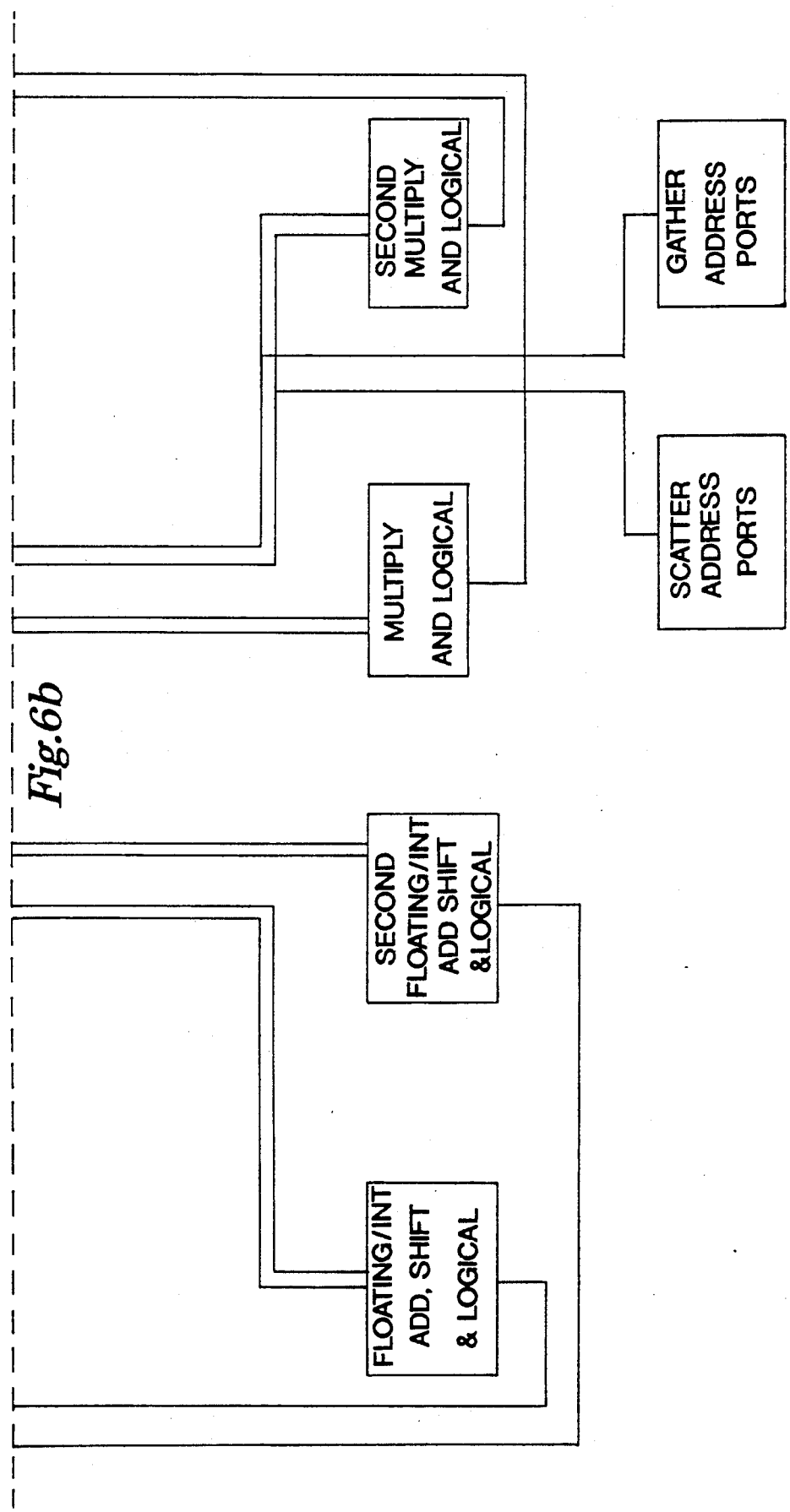

METHOD AND APPARATUS FOR A SPECIAL PURPOSE ARITHMETIC BOOLEAN UNIT

RELATED APPLICATIONS

This application is a continuation-in-part of an application filed in the United States Patent and Trademark Office on Dec. 29, 1989, entitled CLUSTER ARCHITECTURE FOR A HIGHLY PARALLEL SCALAR/VECTOR MULTIPROCESSOR SYSTEM Ser. No. 07/459,083, and assigned to the assignee of the present invention, which is hereby incorporated by reference in the present application. This application is also related to a copending application filed in the United States Patent and Trademark Office concurrently herewith, entitled SCALAR/VECTOR PROCESSOR, Ser. No. 07/536,409, which is assigned to the assignee of the present invention, a copy of which is attached hereto as an appendix and is hereby incorporated by reference in the present application.

TECHNICAL FIELD

This invention relates generally to the field of arithmetic and logical functional units for use in computer and electronic logic systems. More particularly, the present invention relates to a method and apparatus for a special purpose arithmetic boolean unit for performing extremely parallel bit-level boolean operations and matrix manipulations.

BACKGROUND ART

In an effort to increase the processing speed and flexibility of traditional high-speed supercomputers that utilize vector processors in a minimally parallel computer processing system, the cluster architecture for highly parallel multiprocessors described in previously identified parent application, Ser. No. 07/459,083 provides a supercomputer architecture that extends the direct-connection methods of inter-processor communication of minimally parallel computer processing systems to encompass greater numbers of processors. While this architecture effectively addresses the problem of interprocessor communication and coordination for highly parallel computer processing systems, it does not offer an effective alternative to the massively parallel single-instruction, multiple-data (SIMD) or multiple-instruction, multiple data (MIMD) processor array systems that operate on extremely parallel problems. For these types of extremely parallel or very fine grain parallelism problems, the individual power of the processing element is not as important as the total number of processing elements that can be used in parallel. Because traditional vector processor supercomputers have a limited number of processors, they have generally not been used for these types of problems.

Another type of extremely parallel problem that cannot be efficiently solved with a traditional vector processor or an array processor, or a massively parallel computer processing system is extremely parallel bit-level boolean operations, particularly bit matrix manipulations. An example of such an extremely parallel bit manipulation problem is the transposition of an $N \times N$ bit array. Certain standalone, hardwired bit manipulation machines have been created for very specialized purposes that would be capable of efficiently performing this type of bit-level manipulation; however, none of the more general purpose computer processing systems have the capability to efficiently perform extremely parallel bit-manipulation operations.

Although some extremely parallel SIMD and MIMD problems can be solved using traditional massively parallel or array processor supercomputers, it would be desirable to provide a method and apparatus that would enable other types of supercomputers to also effectively work on these extremely parallel problems. More particularly, it would be advantageous to provide a method and apparatus that could efficiently solve extremely parallel bit-level boolean operations without requiring the use of a standalone, specialized hardwired processor that is independent from a general purpose computer processing system.

SUMMARY OF THE INVENTION

The present invention provides a new method and apparatus for a special purpose arithmetic boolean unit that is capable of performing extremely parallel bit-level boolean operations, particularly bit matrix manipulations. The special purpose arithmetic boolean unit is especially adapted for use in cooperation with traditional vector processors, thereby enabling a vector processor to effectively solve extremely parallel MIMD or SIMD boolean problems without requiring an array processor or massively parallel supercomputer. The boolean unit of the present invention is a user-programmable, fully pipelined, parallel bit manipulation device for transforming an N-bit wide operand into an N-bit wide result each clock cycle in a traditional vector processor. The bit manipulation device is programmed by loading an $N \times N$ bit state array from a vector register. This bit state array specifies the logical transformation that the bit manipulation device will apply to the operand bit stream from a vector register. The specified logical transformations are performed by the bit manipulation device when a vector register operand is applied to the boolean unit, with the results of the logical transformation stored in a vector register.

The boolean unit of the present invention allows a traditional vector processor to be effectively used on SIMD/MIMD extremely parallel problems, as well as extremely parallel bit-level manipulation and matrix problems. For SIMD/MIMD problems, such as signal processing, the bit state array can be programmed to filter the incoming data on a bit-by-bit level. In this sense, each of the bits in the $N \times N$ bit state array, paired with its individual bit manipulation means, operates as a single processing element. In the preferred embodiment, the boolean unit consists of 4096 such individual processing elements, together capable of transforming an 64-bit wide operand into an 64-bit wide result each clock cycle.

An objective of the present invention is to provide a method and apparatus for a special purpose boolean arithmetic unit that is especially adapted for performing parallel bit-level boolean operations.

Another objective of the present invention is to provide a method and apparatus for a special purpose boolean arithmetic unit that can solve extremely parallel SIMD problems without the use of traditional SIMD or MIMD array processors or massively parallel supercomputers.

A further objective of the present invention is to provide a special purpose boolean arithmetic unit that is capable of performing bit-level matrix manipulations in a traditional vector processor.

These and other objectives of the present invention will become apparent with reference to the drawings, the detailed description of the preferred embodiment and the appended claims.

DESCRIPTION OF THE DRAWINGS

FIGS. 4a–4g are schematic representations of data depicting various operations that the boolean unit of the present invention can perform.

FIG. 5 is an alternative embodiment of the boolean operator of the boolean unit of the present invention.

FIG. 6 illustrates the vector and scalar registers with the vector register unit and the input and output paths of the unit.

DESCRIPTION OF THE PREFERRED EMBODIMENTS

Figure 1:
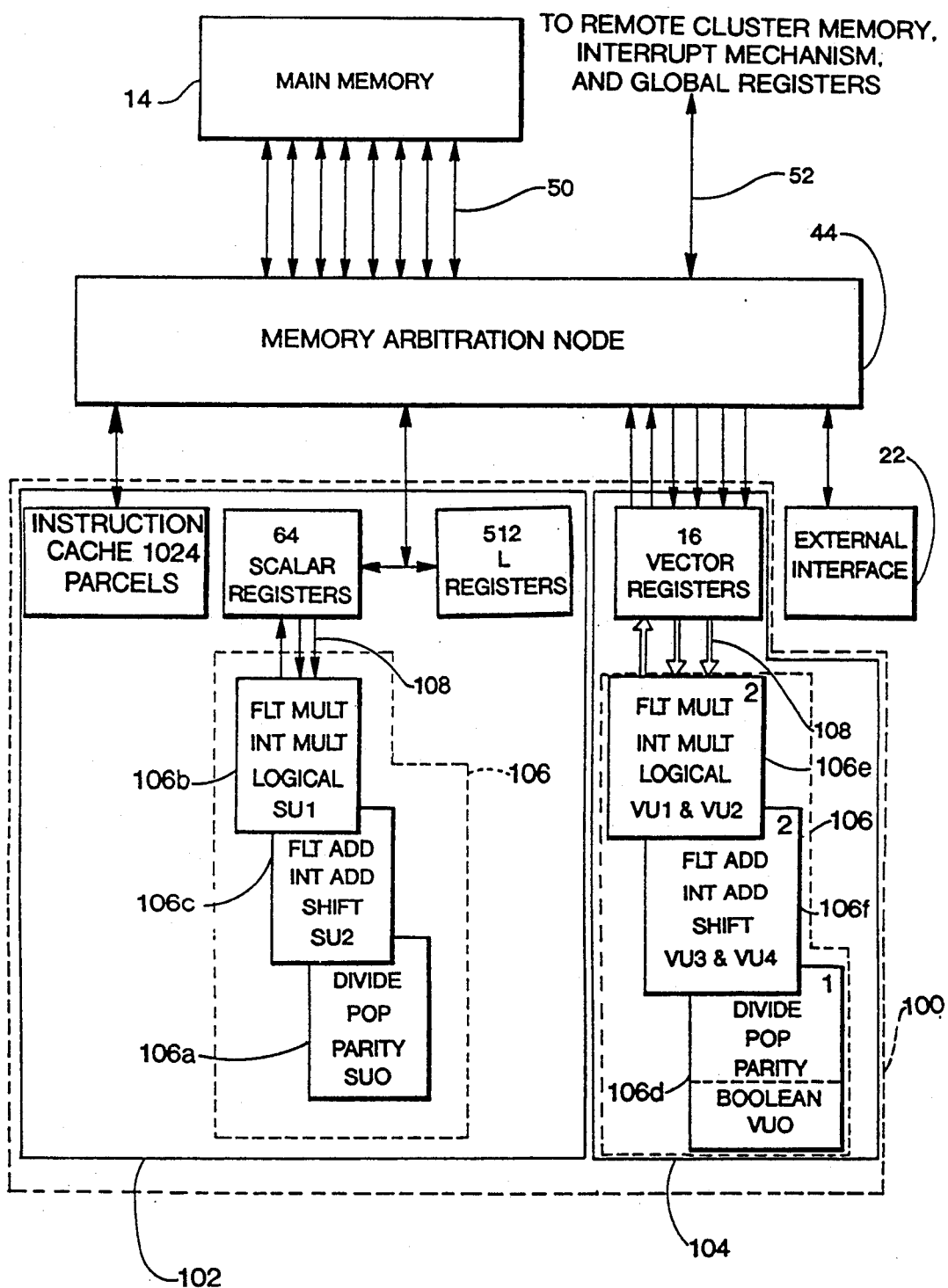
FIG. 1 is a block diagram of a single scalar/vector processor with associated arbitration node providing a link to main memory, showing the present invention as a special purpose functional unit associated with the vector processing means.

Referring now to FIG. 1, a block diagram showing a single processor 100 that comprises the environment for the preferred embodiment of the present invention will be described. It will be recognized that the special purpose boolean arithmetic unit of the present invention may be implemented in many kinds of processors and still be within the scope of the present invention. For example, the special purpose boolean arithmetic unit could be implemented in a single vector processor that did not have the capability of both vector and scalar processing. Although it is preferred that the boolean unit be used in conjunction with a vector processor, it is possible for the boolean unit to also be used with a scalar processor; however, the size of the bit state array that could be operated on by such a combination with a single instruction may be smaller because of the smaller size of the functional units associated with the scalar processor, or may be slower because of the need to load the bit state array directly from memory.

In the preferred embodiment, the processor 100 is logically and physically partitioned into a scalar processor 102 and a vector processor 104. Both the scalar processor 102 and the vector processor 104 have their own register sets and dedicated arithmetic resources as described in greater detail in the previously identified co-pending application entitled SCALAR/VECTOR PROCESSOR. All registers and data paths in the processor 100 are 64-bits (one word) wide. For the scalar processor 102, there are 64 scalar S registers and 512 local L registers. The vector processor 104 has 16 vector V registers. The architecture can support up to a total combination of 256 S and V registers per processor 100. Each processor 100 also has up to 256 control C registers (not shown) that are physically distributed throughout the processor 100 and are used to gather and set control information associated with the operation of the processor 100.

Figure 2:
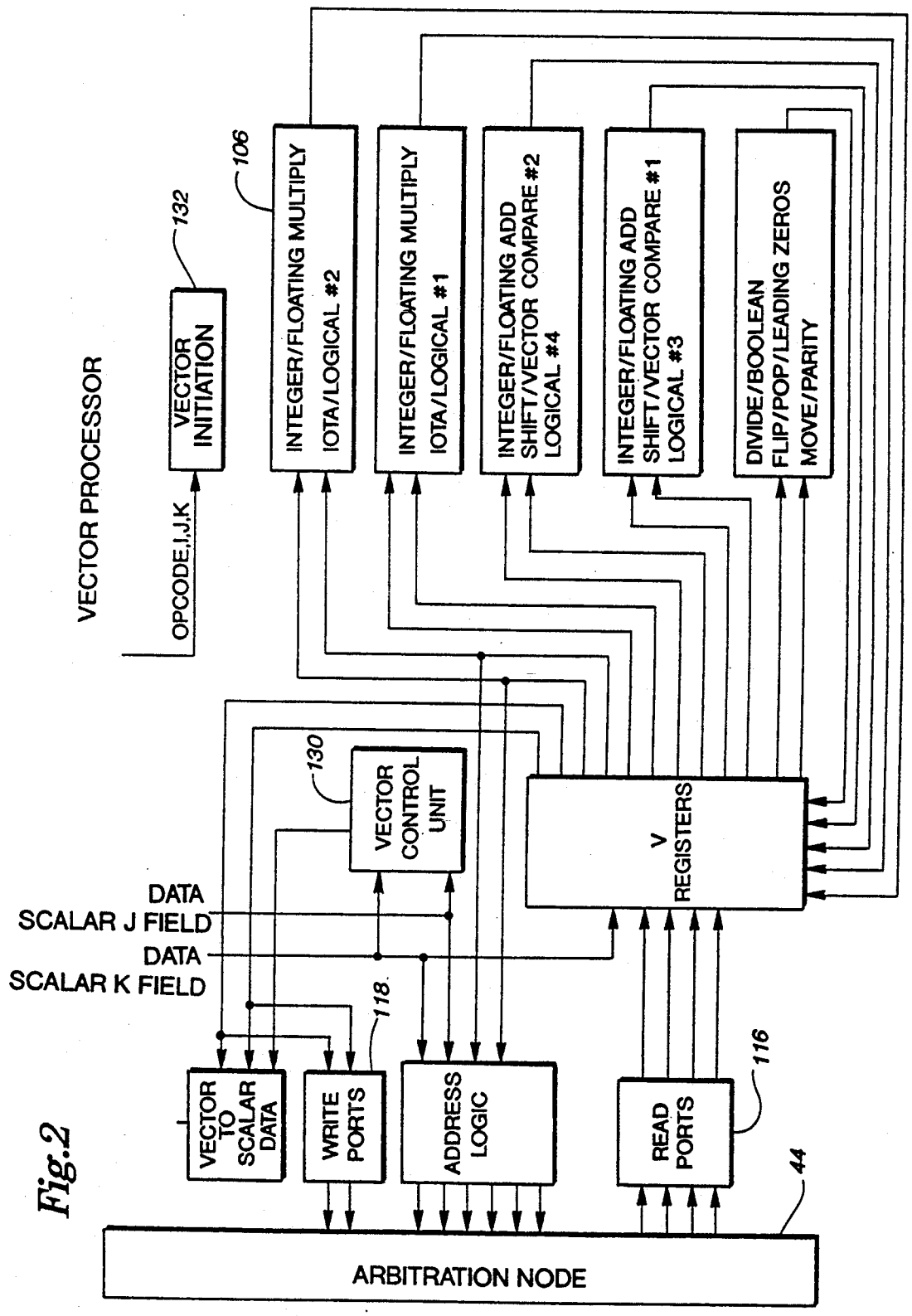
FIG. 2 is a more detailed block diagram of the vector processing means shown in FIG. 1.

Unlike most prior scalar/vector processors, the scalar processor 102 and vector processor 104 that comprise the high-speed processor 100 of the preferred embodiment are capable of simultaneous operation. As shown in FIGS. 1 and 2, both the scalar processor 102 and the vector processor 104 include a plurality of arithmetic resources in the form of arithmetic functional units 106. For the scalar processor 102, the arithmetic functional units 106 include: Scalar Unit SU0 (divide, pop, and parity) 106a; Scalar Unit SU1 (floating point multiply, integer multiply, and logical operations) 106b; and Scalar Unit SU2 (floating point addition, integer addition, and shift operations) 106c. For the vector processor 104, the arithmetic functional units 106 include: Vector Unit VU0 (divide, pop, parity and the boolean unit of the present invention) 106d; Vector Units VU1 and VU2 (floating point multiply, integer multiply, and logical operations) 106e; and Vector Units VU3 and VU4 (floating point addition, integer addition, logical and shift operations) 106f. Internal paths 108 to each of the functional units 106 may be allocated independently in the scalar processor 102 and vector processor 104 and each of the functional units 106 can operate concurrently, thereby also allowing the scalar processor 102 and vector processor 104 to operate concurrently. No functional units 106 are shared between the scalar processor 102 and the vector processor 104.

Figure 3:
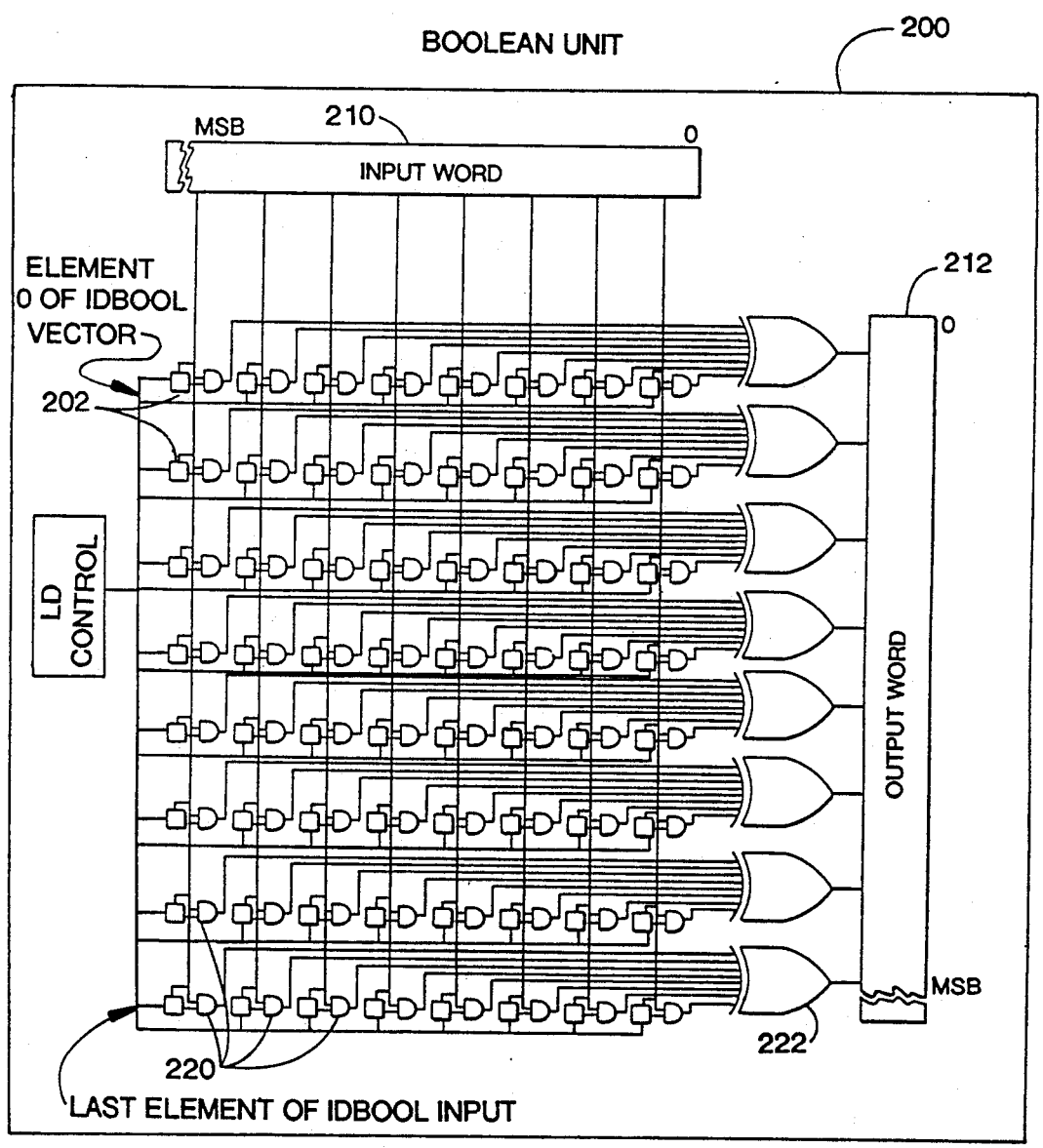
FIG. 3 is a block diagram of a portion of the boolean unit of the preferred embodiment of the present invention within the vector processing means.

Referring now to FIG. 3, the operation of the boolean unit 200 of the present invention will be described. The boolean unit 200 is within one of the functional units 106 associated the vector processor 104. In the preferred embodiment of the processor 100, the word size is 64 bits and, consequently, the boolean unit 200 is 64×64 bits. In this embodiment, the boolean unit 200 is associated with the VU0 functional unit 106d. It will be recognized that the size of the boolean unit 200 and its N×N state bit array, as well as the location of the boolean unit 200 in relation to the other functional units 106, are design choices dependent upon the word size of the processor 100, the size of the other processing elements in the processor 100 and the amount of circuitry that can be devoted to the boolean unit 200. For optimum efficiency, however, the boolean unit 200 should be located near and connected to a processor 100 such that it can easily receive as input words having significant bit length and easily return as output words of equal length.

For ease of representation, FIG. 3 shows the circuitry associated with only an 8×8 bit section of the boolean unit 200. Each state bit 202 represents a single state bit of the N×N state bit array, which is preferably 64×64. Prior to the operation of the bit manipulation logic circuitry 204 of the boolean unit 200, each of the 4096 state bits 202 of the N×N state bit array is sequentially loaded from a vector register using the LDBOOL instruction. Specifically, Row 0 is loaded from vector element 0, Row 1 is loaded from vector element 1, and so forth up to Row 63 which is loaded from vector element 63. In the preferred embodiment, the V registers are comprised of 64 elements. It will be recognized, however, that larger or smaller vector registers may be used in conjunction with the present invention. For example a V register having 128 elements could be used to provide input values to the boolean unit 200 with the vector length and vector offset control registers set appropriately to specify only 64 elements per transfer.

The state bit array specifies the logical transformation performed on the operand bit stream. This transformation occurs when the BOOL instruction is executed with a specified vector register operand and an output vector register (result). A copy of the specifications for the LDBOOL and BOOL instructions are attached to this application as Appendix A, which is hereby incorporated by reference.

The execution of the BOOL instruction by the vector processor 104 inputs a vector operand (vector element by vector element) from the input word 210 into the boolean unit 200. The boolean unit 200 performs the transformation using the bit manipulation logic circuitry 204 to produce a vector result (vector element by vector element) that is stored in the output word 212. In the preferred embodiment, the boolean unit 200 operates on the input word 210 at the rate of 64 bits per clock cycle, generating results to be stored in the output word 212 at the same rate. Both the input word 210 and the output word 212 are selectively connected by internal paths and appropriate muxes to each of the V registers of the vector processor 104. The state bits 202 are also connected by internal paths and appropriate muxes to each of the V registers of the vector processor 104. As a result, there is no dependence between the boolean unit 200 and any particular set or group of V registers in the vector processor 104.

Referring now to FIG. 6, the vector register unit 232 and its instruction control mechanisms will be described.

The vector control logic 130 interfaces with the instruction issue and memory interface logic. This logic includes multiplexors (not shown) for controlling ten 64-bit data path inputs 150 and the twelve 64-bit data path outputs 152 of the vector register unit 232.

The ten 64-bit data path inputs to the vector registers are coupled to
Memory load port 116-0
Memory load port 116-1
Memory load port 116-2
Memory load port 116-3
Scalar registers 120
Add, shift, and logical functional unit VU3
Add, shift, and logical functional unit VU4
Multiply and logical functional unit VU1
Multiply and logical functional unit VU2
Divide, pop count, parity, leading zero, and boolean functional units—VU0

The twelve 64-bit data path outputs from the vector registers are coupled to scaler registers 120
Memory store port 0/scalar registers 118-0
Memory store port 1/scalar registers 118-1
Divide, pop count, parity, leading zero, and boolean functional units VU0
Add, shift, and logical functional unit VU3
Add, shift, and logical functional unit VU4
Multiply and logical functional unit VU2/Gather and Scatter address ports (9 and 10)
Multiply and logical functional unit VU1

The unit 232 includes sixteen vector registers V0–V15, a group of scalar registers 154-0 to 154-4, one for each functional unit VU0 to VU4. A 16:1 multiplexor (not shown) couples register outputs to the j field inputs of the functional units VU0 to VU4, to the data write ports 118 and scalar registers 120 and to the scatter/gather ports. A 17:1 multiplexor couples V register outputs or the outputs of registers 154-0 to 154-4 to the k field inputs of the functional units VU0 to VU4 when one of the operands of a currently executing instruction is either vector or scalar respectively. A second set of scalar registers 156-0 to 156-4 is provided for scalar data of dependently initiated instructions in the queue of each respective functional unit VU0–VU4. As each dependently initiated instruction is advanced for execution in its functional unit, its scalar data is moved from its register 156n to the corresponding register 154n. These registers are filled from the 5 registers.

Each vector register (V0 to V15) may be read from and/or written to once per clock. This means that a single vector register cannot be supplying operands for more than one instruction at a time or be receiving results from more than one instruction at a time. A vector is "reserved for reads" if it is currently being read; this holds off the start of another instruction that will read that register. Similarly, a vector register is "reserved for writes" when it is the target result register of a currently executing instruction; this blocks the start of a subsequent instruction that would write to that register.

However, a single vector register may supply two operands to a single functional unit, if that register is specified by both j and k fields of a valid vector instruction.

The vector control logic 130 also provides the mechanism for chaining multiple vector instructions together. This means that an instruction to read from a vector register may initiate while another instruction is writing data into that register. Vector control ensures that the new instruction will not get ahead of the previous instruction which is supplying it with data.

If a vector register is "reserved for reads," another instruction to write to that register is not initiated. When the previous read completes, there are several cycles of overhead and then the write into the vector register may start.

In the preferred embodiment as shown in FIG. 3, the logical transformation that is implemented by the bit manipulation logic circuitry 204 is an AND/XOR boolean function. Thus, the bit manipulation logic circuitry 204 utilizes an AND operator 220 for each bit in the row with an XOR operator 222 at the end of each row. The input word 210 is ANDED on a bit-by-bit basis with each row of the state bit array. The result of this AND logic operation is then exclusive-or (XOR) reduced for each row of the state bit array such that each row provide a single bit of output to be stored in the output word 212. The output word 212 is then delivered to the appropriate vector element in the V register as the result. It will be recognized that other boolean operators, such as AND, OR, XOR, NAND, or NOR, may also be combined together in the bit manipulation logic circuitry 204 of the present invention to produce other types of boolean logical results. For example, the XOR operator 222 might be replaced with an AND operator, and the AND operator 220 might be replaced with a XOR operator. This combination would be useful in searching a bit matrix for a particular bit pattern combination.

Referring now to FIGS. 4a–4g, some of the possible operations of the boolean unit 200 of the preferred embodiment of the present invention are shown. In these schematic representations, the contents of the bit state array 202 is shown first, followed by the contents of the input vector that is loaded on a vector element-by-vector element basis into the input word 210, and finally the contents of the output vector as it is stored in the output word 212 on a vector element-by-vector element basis. The notation for the contents of the input vector and output vector tables is such that "e0.63" refers to vector element 0, bit 63, "e61. 62" refers to vector element 61, bit 62, and so forth.

FIG. 4a shows an identity operation where the input vector is identically reproduced in the output vector. FIG. 4b shows a bit reverse operation where the order of the bits in the input vector are reversed on a row-by-row basis. FIG. 4c shows a field extraction operation where selected columns of the input vector are extracted (in this example, columns 0, 62 and 63). FIG. 4d shows a selection (packing) operation where selected columns are extracted and the remaining columns are right shifted to fill in the vacant columns. FIG. 4e shows a permutation operation where columns are "randomly shuffled" as specified by the input bit state array 202. FIG. 4f shows a rotate operation where the order of the bits of input vector is reversed on a column-by-column basis. It should be noted that for this operation, the operand vector is loaded into the bit state array 202, and the input vector is used to hold the constant bit state matrix used to create the desired logical operation. Finally, FIG. 4g shows a transpose operation where the all of the bits of the operand vector are reversed, both on a column and row basis.

FIG. 4g provides a good example of how the present invention is capable of performing parallel bit manipulations that would otherwise be very difficult for traditional vector processors or array processors will be described. The transpose operation is a common matrix operation that is used in signal or image processing where a complete transposition of the bit matrix is desired.

It will also be recognized that additional boolean operators other than the AND/XOR boolean function may be switchably connected to the bit manipulation logic circuitry 204 to provide selection among multiple logical transformation capabilities. As shown for example in FIG. 5, more than one logical transformation could be implemented in the circuitry associated with the bit manipulation logic circuitry 204. The desired logical transformation could then be specified in a subopcode field in the BOOL instruction. In this case, a BOOL instruction with a subopcode field=0 might select the AND/XOR boolean combination, while a BOOL instruction with a subopcode=1 might select an XOR/AND boolean combination.

Although the description of the preferred embodiment has been presented, it is contemplated that various changes could be made without deviating from the spirit of the present invention. Accordingly, it is intended that the scope of the present invention be dictated by the appended claims rather than by the description of the preferred embodiment.

Appendix A

LDBOOL v 28 xx xx KK

Load Boolean unit with vector

Assembly syntax     ldbool vk

Hold issue conditions     None

Hold init conditions     Vk reserved for reading.
VL reserved.
FU0 functional unit path reserved.

Function     This loads the contents of vector register vk into the Boolean Unit. Element 0 is loaded into the word corresponding to output bit 0, and so forth. If vector length is less than the size of the Boolean Unit, the remaining words are unchanged. Only those elements 0..(VL) - 1 are altered.

| | |
|---|---|
| Time to completion | Vk to be read: TBD + (VL) cycles<br>FU0 functional unit path free: (VL) cycles or TBD cycles, whichever is greater. |
| Exceptions | None. |
| Comments | VM has no effect on this operation. |

BOOL v v 29 II xx KK

Operate on vector in Boolean unit

| | |
|---|---|
| Assembly syntax | bool vk vi |
| Hold issue conditions | None |
| Hold init conditions | Vk reserved for reading, vi reserved for writing.<br>VL reserved.<br>FU0 functional unit path reserved. |
| Function | Each element of vector vk is presented to the Boolean Unit. Each bit of the result is obtained by an and-xor operation with the word stored in the Boolean Unit for that bit. That is, bit 'b' of element 'e' of the result is a function of word 'b' last stored in the Boolean Unit and of word 'e' of vector vk. Only those elements 0..(VL)-1 of vi are altered, and only those elements where the corresponding bit of VM is one. |
| Time to completion | Vk to be read: TBD+(VL) cycles.<br>FU0 functional unit path free: (VL) cycles or TBD cycles, whichever is greater. |
| Exceptions | None. |
| Comments | This function can be used to implement tilt, bit reverse, bit compress, etc. |

Group 0: Control

| | | | | |
|---|---|---|---|---|
| 00 | trap | t | | Trap to system at (SCA) | (t <<6) |
| 01 | nop | | | No operation |
| 02 | markls | | | Mark local stores |
| 03 | markll | | | Mark local loads |
| 04 | gmark | | | Global mark stores |
| 05 | * | | | |
| 06 | waitmk | | | Wait for local marks in future memory references |
| 07 | * | | | |
| 08 | * | | | |
| 09 | * | | | |
| 0a | fair | | | Fast associate interrupt request |
| 0b | path | t | | Request vector path |
| 0c | rtt | | *(privileged)* | Return from trap |
| 0d | signal | sk | *(privileged)* | Signal, to unit (sk) |
| 0e | * | | | |
| 0f | invic | t | *(privileged)* | Invalidate instruction cache |

Appendix A: Instruction Set Summary

On the following pages, the form of each instruction is listed briefly. In the left column, the opcode is given in hex. In the following columns, the mnemonic and operands are listed in the order of assembler syntax.

An undefined opcode is indicated by an asterisk.

The letter $q$ indicates a signed 8-bit literal in the $k$ field. All other literals are indicated by the letter $n$ and may be in the $ij$ fields, the $jk$ fields, the $m$ field, or the $jkm$ fields, depending on the instruction.

Sometimes a number is followed by a colon and a field size. For example, move $n$:48 $si$ indicates that $n$ is placed in a 48-bit field. This notation distinguishes the forms of the instruction where the mnemonic and registers are insufficient.

Group 1: Global Registers

Address of g register is calculated as:
GOFFSET+(GMASK & (GBASE+j))

| | | | | |
|---|---|---|---|---|
| 10 | addg | s$k$ | g[$n$] | Move (sk) + g into g |
| 11 | addg | $q$ | g[$n$] | Move q + g into g |
| 12 | set | s$k$ | g[$n$] | Move (sk) \| g to g |
| 13 | set | $q$ | g[$n$] | Move q \| g to g |
| 14 | clear | s$k$ | g[$n$] | Move ~(sk) & g to g |
| 15 | clear | $q$ | g[$n$] | Move ~q & g to g |
| 16 | move | s$k$ | g[$n$] | Move (sk) to g |
| 17 | move | $q$ | g[$n$] | Move q to g |

| | | | | |
|---|---|---|---|---|
| 18 | faa | sk | g[n],si | Move g to si; move (sk)+g to g |
| 19 | faa | q | g[n],si | Move g to si; move q+g to g |
| 1a | tas | sk | g[n],si | Move g to si; move (sk) | g to g |
| 1b | tas | q | g[n],si | Move g to si; move q | g to g |
| 1c | fca | sk | g[n], si | Move g to si; add sk to g if the sum would be positive |
| 1d | fca | q | g[n], si | Move g to si; add sk to g if the sum would be positive |
| 1e | swap | sk | g[n],si | Move g to si; move sk to g |
| 1f | move | g[n] | si | Move g to si |

Group 2: Divide Unit

| | | | | |
|---|---|---|---|---|
| 20 | fdiv | sk,sj | si | Floating divide sk / sj to si |
| | fdiv | sk,vj | vi | Floating divide sk / vj to vi |
| | fdiv | vk,vj | vi | Floating divide vk / vj to vi |
| 21 | * | | | |
| 22 | * | | | |
| 23 | * | | | |
| 24 | leadz | sk | si | Leading zero count (sk) to si |
| | leadz | vk | vi | Leading zero count (vk) to vi |
| 25 | flip | sk | si | Left-right bit flip (sk) to si |
| | flip | vk | vi | Left-right bit flip (vk) to vi |
| 26 | pop | sk | si | Population count (sk) to si |
| | pop | vk | vi | Population count (vk) to vi |
| 27 | par | sk | si | Parity (sk) to si |
| | par | vk | vi | Parity (vk) to vi |
| 28 | ldbool | vk | | Load boolean unit from (vk) |
| 29 | bool | vk | vi | Operate on (vk) with boolean unit, to vi |
| 2a | * | | | |
| 2b | * | | | |

2c    *
2d    *
2e    *
2f    *

Group 3: Moves

| | | | | |
|---|---|---|---|---|
| 30 | * | | | |
| 31 | move | s$i$,q | L[$n$] | Move si... for length q to L[j + LBASE] |
| 32 | move | s$k$ | L[$n$] | Move (sk) to L[ij + LBASE] |
| 33 | move | q | L[$n$] | Move q to L[ij + LBASE] |
| 34 | * | | | |
| 35 | movevcvm | | | Move VC register into VM register |
| 36 | move | s$k$ | c$i$ | Move (sk) to control register i |
| 37 | move | q | c$i$ | Move q to control register i |
| 38 | * | | | |
| 39 | move | L[$n$],q | s$i$ | Move L[j+LBASE] to si... for length q |
| 3a | move | L[$n$] | s$i$ | Move (L[jk + LBASE]) to si |
| 3b | move | c$k$ | s$i$ | Move (control register k) to si |
| 3c | select | s$k$,s$j$ | s$i$ | Move (sk) if test true, (sj) if false, to si |
| 3d | select | q,s$j$ | s$i$ | Move q if test true, (sj) if false, to si |
| 3e | move | s$k$ | s$i$ | Move (sk) to si |
|    | move | s$k$ | v$i$ | Move (sk) to each element of vi |
|    | move | v$k$ | v$i$ | Move (vk) to vi |
| 3f | move | q:8 | s$i$ | Move q to si |
|    | move | q:8 | v$i$ | Move q to each element of vi |

Appendix A: Instruction Set Summary

Group 4: Integer Add Unit

| 40 | iadd | sk,sj | si | (sk) + (sj) to si |
|----|------|-------|-----|-------------------|
|    | iadd | sk,vj | vi | (sk) + (vj) to vi |
|    | iadd | vk,vj | vi | (vk) + (vj) to vi |
| 41 | iadd | q,sj  | si | q + (sj) to si |
|    | iadd | q,vj  | vi | q + (vj) to vi |
| 42 | isub | sk,sj | si | (sk) - (sj) to si |
|    | isub | sk,vj | vi | (sk) - (vj) to vi |
|    | isub | vk,vj | vi | (vk) - (vj) to vi |
| 43 | isub | q,sj  | si | q - (sj) to si |
|    | isub | q,vj  | vi | q - (vj) to vi |
| 44 | iaddc | sk,sj | si | (sk) + (sj) + (carry) to si |
|    | iaddc | sk,vj | vi | (sk) + (vj) + VM to si, carry to VC |
|    | iaddc | vk,vj | vi | (vk) + (vj) + VM to si, carry to VC |
| 45 | iaddc | q,sj  | si | q + (sj) + (carry) to si |
|    | iaddc | q,vj  | vi | q + (vj) + VM to si, carry to VC |
| 46 | isubb | sk,sj | si | (sk) - (sj) - 1 + (carry) to si |
|    | isubb | sk,vj | vi | (sk) - (vj) - 1 + VM to si, carry to VC |
|    | isubb | vk,vj | vi | (vk) - (vj) - 1 + VM to si, carry to VC |
| 47 | isubb | q,sj  | si | q - (sj) - 1 + (carry) to si |
|    | isubb | q,vj  | vi | q - (sj) - 1 + VM to si, carry to VC |
| 48 | *    |       |     |                   |
| 49 | iabs | sj    | si | absolute value of (sj) to si |
|    | iabs | vj    | vi | absolute value of (vj) to vi |
| 4a | *    |       |     |                   |
| 4b | *    |       |     |                   |
| 4c | *    |       |     |                   |
| 4d | *    |       |     |                   |
| 4e | *    |       |     |                   |
| 4f | *    |       |     |                   |

Group 5: Floating-Point Add Unit

| 50 | fadd | sk,sj | si | (sk) + (sj) to si |
|----|------|-------|-----|-------------------|
|    | fadd | sk,vj | vi | (sk) + (vj) to vi |
|    | fadd | vk,vj | vi | (vk) + (vj) to vi |

| | | | | |
|---|---|---|---|---|
| 51 | fsub | sk,sj | si | (sk) - (sj) to si |
| | fsub | sk,vj | vi | (sk) - (vj) to vi |
| | fsub | vk,vj | vi | (vk) - (vj) to vi |
| 52 | faddh | sk,sj | si | Floating-point add high bits (sk)+(sj) to si |
| | faddh | sk,vj | vi | Floating-point add high bits (sk)+(vj) to vi |
| | faddh | vk,vj | vi | Floating-point add high bits (vk)+(vj) to vi |
| 53 | faddl | sk,sj | si | Floating-point add low bits (sk) + (sj) to si |
| | faddl | sk,vj | vi | Floating-point add low bits (sk) + (vj) to vi |
| | faddl | vk,vj | vi | Floating-point add low bits (vk) + (vj) to vi |
| 54 | * | | | |
| 55 | * | | | |
| 56 | * | | | |
| 57 | * | | | |
| 58 | * | | | |
| 59 | * | | | |
| 5a | * | | | |
| 5b | * | | | |
| 5c | fix | sk | si | fix (sk) to si |
| | fix | vk | vi | fix (vk) to vi |
| 5d | float | sk | si | float (sk) to si |
| | float | vk | vi | float (vk) to vi |
| 5e | * | | | |
| 5f | * | | | |

Group 6: Multiply Unit

| | | | | |
|---|---|---|---|---|
| 60 | imult | sk,sj | si | Integer multiply (sk) * (sj) to si |
| | imult | sk,vj | vi | Integer multiply (sk) * (vj) to vi |
| | imult | vk,vj | vi | Integer multiply (vk) * (vj) to vi |
| 61 | iumulth | sk,sj | si | Integer unsigned high bits of (sk) * (sj) to si |
| | iumulth | sk,vj | vi | Integer unsigned high bits of (sk) * (vj) to vi |
| | iumulth | vk,vj | vi | Integer unsigned high bits of (vk) * (vj) to vi |
| 62 | fmult | sk,sj | si | Floating multiply (sk) * (sj) to si |
| | fmult | sk,vj | vi | Floating multiply (sk) * (vj) to vi |
| | fmult | vk,vj | vi | Floating multiply (vk) * (vj) to vi |

Appendix A: Instruction Set Summary

| | | | | |
|---|---|---|---|---|
| 63 | fmulth | sk,sj | si | Floating multiply high bits (sk) * (sj) to si |
| | fmulth | sk,vj | vi | Floating multiply high bits (sk) * (vj) to vi |
| | fmulth | vk,vj | vi | Floating multiply high bits (vk) * (vj) to vi |
| 64 | fmultl | sk,sj | si | Floating multiply low bits (sk) * (sj) to si |
| | fmultl | sk,vj | vi | Floating multiply low bits (sk) * (vj) to vi |
| | fmultl | vk,vj | vi | Floating multiply low bits (vk) * (vj) to vi |
| 65 | * | | | |
| 66 | * | | | |
| 67 | * | | | |
| 68 | * | | | |
| 69 | * | | | |
| 6a | * | | | |
| 6b | * | | | |
| 6c | * | | | |
| 6d | * | | | |
| 6e | * | | | |
| 6f | * | | | |

Group 7: Logical Unit

| | | | | |
|---|---|---|---|---|
| 70 | and | sk,sj | si | (sk) & (sj) to si |
| | and | sk,vj | vi | (sk) & (vj) to vi |
| | and | vk,vj | vi | (vk) & (vj) to vi |
| 71 | and | q,sj | si | q & (sj) to si |
| | and | q,vj | vi | q & (vj) to vi |
| 72 | andn | sk,sj | si | (sk) & ~(sj) to si |
| | andn | sk,vj | vi | (sk) & ~(vj) to vi |
| | andn | vk,vj | vi | (vk) & ~(vj) to vi |
| 73 | andn | q,sj | si | q & ~(sj) to si |
| | andn | q,vj | vi | q & ~(vj) to vi |
| 74 | or | sk,sj | si | (sk) \| (sj) to si |
| | or | sk,vj | vi | (sk) \| (vj) to vi |
| | or | vk,vj | vi | (vk) \| (vj) to vi |
| 75 | or | q,sj | si | q \| (sj) to si |
| | or | q,vj | vi | q \| (vj) to vi |
| 76 | orn | sk,sj | si | (sk) \| ~(sj) to si |
| | orn | sk,vj | vi | (sk) \| ~(vj) to vi |
| | orn | vk,vj | vi | (vk) \| ~(vj) to vi |

SS-1 Architecture Volume 2 Hardware

| 77 | orn | q,sj | si | q \| ~(sj) to si |
| | orn | q,vj | vi | q \| ~(vj) to vi |
| | | | | |
| 78 | xor | sk,sj | si | (sk) ^ (sj) to si |
| | xor | sk,vj | vi | (sk) ^ (vj) to vi |
| | xor | vk,vj | vi | (vk) ^ (vj) to vi |
| | | | | |
| 79 | xor | q,sj | si | q ^ (sj) to si |
| | xor | q,vj | vi | q ^ (vj) to vi |
| | | | | |
| 7a | xorn | sk,sj | si | (sk) ^ ~(sj) to si |
| | xorn | sk,vj | vi | (sk) ^ ~(vj) to vi |
| | xorn | vk,vj | vi | (vk) ^ ~(vj) to vi |
| | | | | |
| 7b | xorn | q,sj | si | q ^ ~(sj) to si |
| | xorn | q,vj | vi | q ^ ~(vj) to vi |
| | | | | |
| 7c | nor | sk,sj | si | ~((sk) \| (sj)) to si |
| | nor | sk,vj | vi | ~((sk) \| (vj)) to vi |
| | nor | vk,vj | vi | ~((vk) \| (vj)) to vi |
| | | | | |
| 7d | nor | q,sj | si | ~(q \| (sj)) to si |
| | nor | q,vj | vi | ~(q \| (vj)) to vi |
| | | | | |
| 7e | nand | sk,sj | si | ~((sk) & (sj)) to si |
| | nand | sk,vj | vi | ~((sk) & (vj)) to vi |
| | nand | vk,vj | vi | ~((vk) & (vj)) to vi |
| | | | | |
| 7f | nand | q,sj | si | ~(q & (sj)) to si |
| | nand | q,vj | vi | ~(q & (vj)) to vi |

Group 8: Shift Unit

| 80 | shl | sk,sj | si | Shift left (sk) bits: shift (sj) to si |
| | shl | sk,vj | vi | Shift left (sk) bits: shift (vj) to vi |
| | shl | vk,vj | vi | Shift left (vk) bits: shift (vj) to vi |
| | | | | |
| 81 | shl | q,sj | si | Shift left q bits: shift (sj) to si] |
| | shl | q,vj | vi | Shift left q bits: shift (vj) to vi |
| | | | | |
| 82 | shr | sk,sj | si | Shift right (sk) bits: shift (sj) to si |
| | shr | sk,vj | vi | Shift right (sk) bits: shift (vj) to vi |
| | shr | vk,vj | vi | Shift right (vk) bits: (vj) to vi |
| | | | | |
| 83 | shr | q,sj | si | Shift right q bits: shirt (sj) to si |
| | shr | q,vj | vi | Shift right q bits: shift (vj) to vi |

Appendix A: Instruction Set Summary

| | | | | |
|---|---|---|---|---|
| 84 | rol | sk,sj | si | Rotate left (sk) bits: shift (sj) to si |
| | rol | sk,vj | vi | Rotate left (sk) bits: shift (vj) to vi |
| | rol | vk,vj | vi | Rotate left (vk) bits: shift (vj) to vi |
| 85 | rol | q,sj | si | Rotate left q bits: shift (sj) to si |
| | rol | q,vj | vi | Rotate left q bits: shift (vj) to vi |
| 86 | ror | sk,sj | si | Rotate right (sk) bits: shift (sj) to si |
| | ror | sk,vj | vi | Rotate right (sk) bits: shift (vj) to vi |
| | ror | vk,vj | vi | Rotate right (vk) bits: shift (vj) to vi |
| 87 | ror | q,sj | si | Rotate right q bits: shift (sj) to si |
| | ror | q,vj | vi | Rotate right q bits: shift (vj) to vi |
| 88 | asl | sk,sj | si | Shift left (sk) bits: arithmetic shift (sj) to si |
| | asl | sk,vj | vi | Shift left (sk) bits: arithmetic shift (vj) to vi |
| | asl | vk,vj | vi | Shift left (vk) bits: arithmetic shift (vj) to vi |
| 89 | asl | q,sj | | Shift left q bits: arithmetic shift (sj) to si |
| | asl | q,vj | | Shift left q bits: arithmetic shift (vj) to vi |
| 8a | asr | sk,sj | si | Shift right (sk) bits: arithmetic shift (sj) to si |
| | asr | sk,vj | vi | Shift right (sk) bits: arithmetic shift (vj) to vi |
| | asr | vk,vj | vi | Shift right (vk) bits: arithmetic shift (vj) to vi |
| 8b | asr | q,sj | si | Shift right q bits: arithmetic shift (sj) to si |
| | asr | q,vj | vi | Shift right q bits: arithmetic shift (vj) to vi |
| 8c | dshl | sk,vj | vi | Double shift left by (sk) bits: shift (vj) to vi |
| 8d | dshl | q,vj | vi | Double shift left by q bits: shift (vj) to vi |
| 8e | dshr | sk,vj | vi | Double shift right by (sk) bits: shift (vj) to vi |
| 8f | dshr | q,vj | vi | Double shift right by q bits: shift (vj) to vi |

Group 9: Special Operations

| | | | | |
|---|---|---|---|---|
| 90 | move | vk[sj] | si | Move element (sj) of vk to si |
| 91 | move | vk[n] | si | Move element j of vk to si |
| 92 | move | sk | vi[sj] | Move (sk) into element (sj) of vi |
| 93 | move | sk | vi[n] | Move (sk) into element j of vi |
| 94 | cmprs | vk | vi | Compress (vk) to vi |

| | | | | |
|---|---|---|---|---|
| 95 | * | | | |
| 96 | iota | sk | vi | Iota vector, stride (sk), to vi |
| 97 | iota | q | vi | Iota vector, stride q, to vi |
| 98 | iset | sk,t,sj | | Set integer compare (sk) <t> (sj) |
| | iset | sk,t,vj | | Set VC bits on compare (sk) <t> (vj) |
| | iset | vk,t,vj | | Set VC bits on compare (vk) <t> (vj) |
| 99 | iset | q,t,sj | | Set integer compare q <t> (sj) |
| | iset | q,t,vj | | Set VC bits on compare q <t> (vj) |
| 9a | fset | sk,t,sj | | Set floating compare (sk) <t> (sj) |
| | fset | sk,t,vj | | Set VC bits on compare (sk) <t> (vj) |
| | fset | vk,t,vj | | Set VC bits on compare (vk) <t> (vj) |
| 9b | * | | | |
| 9c | * | | | |
| 9d | * | | | |
| 9e | * | | | |
| 9f | * | | | |

Group A: Memory Stores

| | | | | |
|---|---|---|---|---|
| a0 | store | vi | (sj),sk | Store (vi) at address (sj), stride (sk) |
| a1 | store | vi | (sj),q | Store (vi) at address (sj), stride q |
| a2 | * | | | |
| a3 | store | si | (sj+q:8) | Store (si) at address (sj) + q |
| | store | vi | (sj+q:8) | Store (vi) at address (sj) + q, stride 1 |
| a4 | store | vi | (vj+sk) | Scatter (vi) at addresses (vj) plus (sk) |
| a5 | store | vi | (vj+q:8) | Scatter (vi) at addresses (vj) plus q |
| a6 | * | | | |
| a7 | * | | | |

Appendix A: Instruction Set Summary

| | | | | |
|---|---|---|---|---|
| a8 | * | | | |
| a9 | * | | | |
| aa | store | L,s*k* | (s*j*) | Store L, start at LBASE, length (sk), at (sj) |
| ab | store | L,*q* | (s*j*) | Store L, start at LBASE, length *q*, at (sj) |
| ac | * | | | |
| ad | * | | | |
| ae | * | | | |
| af | * | | | |

Group B: Memory Loads

| | | | | |
|---|---|---|---|---|
| b0 | load | (s*j*),s*k* | v*i* | Load from (sj) into vi, stride (sk) |
| b1 | load | (s*j*),*q* | v*i* | Load from (sj) into vi, stride q |
| b2 | load | (s*j*+s*k*) | si | Load from (sj)+(sk) into si |
|    | load | (s*j*+s*k*) | vi | Load from (sj)+(sk) into vi, stride 1 |
| b3 | load | (s*j*+*q*:8) | si | Load from (sj) + q into si |
|    | load | (s*j*+*q*:8) | vi | Load from (sj) + q into vi, stride 1 |
| b4 | load | (v*j*+s*k*) | vi | Gather from addresses (vj) plus (sk) into vi |
| b5 | load | (v*j*+*q*:8) | vi | Gather from addresses (vj) plus q into vi |
| b6 | loadf | (v*j*+s*k*) | vi | Gather from addresses (vj) plus (sk) into vi, write pattern FFF4000000000000 into memory addresses (vj) plus (sk). |
| b7 | loadf | (v*j*+*q*:8) | vi | Gather from addresses (vj) plus q into vi, write pattern FFF4000000000000 into memory addresses (vj) plus q. |
| b8 | loadf | (s*j*),s*k* | vi | Load from (sj) into vi, stride (sk); write pattern FFF4000000000000 into memory addresses (sj) stride (sk) |
| b9 | loadf | (s*j*+q:8) | si | Load (sj)+q into si, write pattern FFF4000000000000 into memory address (sj) |

|    | loadf | (s*j*+q:8) | vi       | Load (sj)+q into vi, stride 1; write pattern FFF4000000000000 into memory addresses (sj)+q stride 1 |
|----|-------|------------|----------|---|
| ba | load  | (s*j*)     | L,s*k*   | Load L, start at LBASE, length (sk), from (sj) |
| bb | load  | (s*j*)     | L,*q*    | Load L, start at LBASE, length *q*, from (sj) |
| bc | *     |            |          |   |
| bd | *     |            |          |   |
| be | *     |            |          |   |
| bf | *     |            |          |   |

Group C: Delayed Jumps

| c0 | jli | s*k,t,*s*j* | *n* | Delayed rel. jump (likely) if int (sk) <t> (sj) |
|----|-----|-------------|-----|---|
| c1 | jli | *q,t,*s*j* | *n* | Delayed rel. jump (likely) if int q <t> (sj) |
| c2 | jui | s*k,t,*s*j* | *n* | Delayed rel. jump (unlikely) if int (sk) <t> (sj) |
| c3 | jui | *q,t,*s*j* | *n* | Delayed rel. jump (unlikely) if int q <t> (sj) |
| c4 | jlf | s*k,t,*s*j* | *n* | Delayed rel. jump (likely) if flt (sk) <t> (sj) |
| c5 | *   |             |     |   |
| c6 | juf | s*k,t,*s*j* | *n* | Delayed rel. jump (unlikely) if flt (sk) <t> (sj) |
| c7 | *   |             |     |   |
| c8 | *   |             |     |   |
| c9 | *   |             |     |   |
| ca | *   |             |     |   |
| cb | *   |             |     |   |
| cc | j   | s*k*        |     | Delayed jump to address (sk) |
| cd | j   | *n*         |     | Delayed jump to address jkm |
| ce | js  | s*k*        | s*i* | Delayed jump to subroutine at (sk) |
| cf | js  | *n*         | s*i* | Delayed jump to subroutine at jkm |

Appendix A: Instruction Set Summary

Group D: Long Literals

| | | | | |
|---|---|---|---|---|
| d0 | move | n:48 | si | Move jkm to lower 48 bits of si: set upper bits to 0 |
| d1 | move | -n:48 | si | Move jkm to lower 48 bits of si; set upper bits to 1 |
| d2 | mergelo | n,sk | si | Move m to lower 32 bits of si: set upper bits from (sk) |
| d3 | movehi | n | si | Move m to upper 32 bits of si: set lower bits to 0 |
| d4 | bfield | sk[a,b],sj | si | Merge bits b through a from sk with sj: move into si |
| d5 | * | | | |
| d6 | * | | | |
| d7 | * | | | |
| d8 | fill | sk | | Fill instruction cache from address (sk) |
| d9 | fill | n | | Fill instruction cache from address jkm |
| da | * | | | |
| db | * | | | |
| dc | * | | | |
| dd | * | | | |
| de | * | | | |
| df | * | | | |

Group E: Long Loads and Stores

| | | | | |
|---|---|---|---|---|
| e0 | store | si | (n) | Store si at address in jkm |
| | store | vi | (n) | Store vi at address in jkm, stride 1 |
| e1 | load | (n) | si | Load si from address in jkm |
| | load | (n) | vi | Load vi from address in jkm, stride 1 |

| e2 | store | si | (sj+n:32) | Store si at address (sj) + m |
| | store | vi | (sj+n:32) | Store vi at address (sj) + m, stride 1 |
| e3 | load | (sj+n:32) | si | Load si from address (sj) + m |
| | load | (sj+n:32) | vi | Load vi from address (sj) + m, stride 1 |
| e4 | * | | | |
| e5 | * | | | |
| e6 | * | | | |
| e7 | * | | | |
| e8 | * | | | |
| e9 | * | | | |
| ea | * | | | |
| eb | * | | | |
| ec | * | | | |
| ed | * | | | |
| ee | * | | | |
| ef | * | | | |

Group F: Pad

| f0 | pad | Pad to word boundary |
| f1-ff | * | |

We claim:

1. A special purpose boolean arithmetic unit for use in connection with an arithmetic and logic unit of a computer processor comprising:
   bit state array means operably connected to the arithmetic and logic unit for storing bit level values of a boolean matric having an N×N dimension with N rows and N columns where N is an integer greater than 1;
   input means operably connected to the arithmetic and logic unit for storing bit values of an N-bit wide input operand;
   bit manipulation means operably connected to the bit state array means and the input means for performing at least two boolean logic operations on each corresponding bit of the boolean matrix and the input operand; and
   output means operably connected to the bit manipulation means and to the arithmetic and logic unit for receiving the results of the boolean operation as a N-bit wide output result and presenting the output result to the arithmetic and logic unit such that the specific processor boolean arithmetic logic unit receives the N-bit wide input operand from the arithmetic logic unit of the computer processor and performs a bit level boolean matrix operations using the boolean matrix stored in the bit state array means to produce the byte wide output result that is returned to the arithmetic logic unit.

2. The boolean arithmetic unit of claim 1 wherein the input means and the output means are each N-bit registers that are operatively connected to the arithmetic and logic unit of a vector processor for respectively receiving the input operands and storing the output results of the special purpose boolean arithmetic unit as successive vector elements of one or more vector registers in the vector processor.

3. The boolean arithmetic unit of claim 1 wherein the bit manipulation means is comprised of an AND logical operator associated with each bit value of the bit state array means and the input means, and an XOR logical operator operably connected to the output of each AND logical operator for each row of the boolean matrix.

4. The boolean unit of claim 2 wherein the bit manipulation means receives one input operand and generates one output result on each clock cycle of the computer processor.

5. The boolean unit of claim 1 wherein the bit manipulation means further includes control means for selecting one or more boolean operations to be performed by the bit manipulations means responsive to a subopcode field in an instruction executed in the computer processors that invokes the bit manipulation means.

6. A method for performing extremely parallel bit-level manipulations on a vector operand stored as a series of N N-bit wide vector elements in a vector register operably connected to an arithmetic logic unit of a vector processor where N is an integer greated than 1, the method comprising the steps:
  (a) loading an N×N bit state array with a set of bit values representing a bit matrix that specifies a logical transformation to be performed on each N-bit wide vector element of the vector operand, and for each vector element performing the steps of:
  (b) loading the N-bit wide vector element into an N-bit wide input register;
  (c) performing a first logical operation on a bit-by-bit basis between each bit of the input register and each bit in each row of the bit state to generate a row-by-row result;
  (d) performing a second logical operation to reduce each row result to single bit output; and
  (e) storing the single bit outputs for each row in an N-bit wide output register such that each vector element is loaded into the arithmetic logic unit of the vector processor as an N-bit wide input operand to be used as part of the input for a bit level boolean matrix operation using the bit matrix stored in the N×N bit state array means to produce an N-bit wide output result that is stored in the output register and is available for further operation by the arithmetic logic operation of the vector processor.

7. The method of claim 6 wherein step (a) is accomplished by sequentially loading the N×N bit state array from a vector register such that each row in the bit state array is loaded from a corresponding vector element in the vector register.

8. The method of claim 6 wherein step (b) is accomplished by sequentially loading the input register from a vector register, one vector element at a time.

9. The method of claim 6 wherein step (a) is accomplished by sequentially loading the N×N bit state array from a first vector register such that each row in the bit state array is loaded from a corresponding element in the first vector register and step (b) is accomplished by loading the input register from a second vector register, one vector element at a time, and wherein the method further comprises the step of:
  (f) storing the output in a third vector register, one vector element at a time.

10. The method of claim 6 wherein the first logical operation is an AND and the second logical operation is an XOR.

11. The method of claim 6 wherein the first logical operation is an XOR and the second logical operation is an AND.

12. The method of claim 9 wherein one output register is generated on each successive clock cycle of the vector processor and loaded into one of the vector elements of the third vector register.

13. A logic circuit for performing extremely parallel bit-level manipulations as part of the arithmetic and logic unit of a vector prodessor having a plurality of vector registers, each vector register comprised of N vector elements with each vector element being N-bits wide where N is an integer greater 1, the logic circuit comprising:
  an N-bit wide input register operably connected to the vector registers for receiving a vector operand one vector element at a time, the vector openand being stored in a selected one of the vector registers;
  an N-bit wide output register operably connected to the vector registers for providing a vector output one vector element at a time, the vector output to be stored in a selected one of the vector registers,
  a bit state array means for storing a boolean matrix comprised of N rows and N columns of individual bits, the bit state array means being operably connected to and loaded from a selected one of the vector registers;
  first boolean logic means operably connected to the input register and the bit state array means for performing a first logical operation on a bit-by-bit basis between each bit of the input register and all of the bits in a corresponding row of the bit state array means to produce a row-by-row result; and
  second boolean logic means operably connected to the first boolean logic means and the output register for performing a second logical operation on all of the bits in each of the row-by-row results to reduce each row-by-row result to a single bit output to be stored in a corresponding bit of the output register such that each vector operand is loaded into the logic circuit of the arithmetic logic unit of the vector processor as an N-bit wide input operand to be used as part of the input for a bit level boolean matrix operation using the boolean matrix stored in the bit state array means to produce an N-bit wide output result that is stored in the output register and is available for further operations by the arithmetic logic unit of the vector processor.

14. The logic circuit of claim 13 wherein the bit state array means is loaded from a selected one of the vector registers by sequentially loading the N×N bit state array means from the selected vector register such that each row in the bit state array is loaded from a corresponding vector element in the selected vector register.

15. The logic circuit of claim 13 wherein first and second logical operations are performed in a single clock cycle of the vector processor, and the vector elements of the vector operand are loaded into the input register and the vector elements of the vector output are loaded from the output register on successive clock cycles of the vector processor.

16. The logic circuit of claim 13 wherein the first logical operation is an AND logical operation and the second logical operation is an XOR logical operation.

17. The logic circuit of claim 13 wherein the first logical operation is an XOR logical operation and the second logical operation is an AND logical operation.

18. The logic circuit of claim 13 wherein N is equal to 64 such that each vector register comprised of 64 vector elements with each vector elements is 64-bits wide.

* * * * *

UNITED STATES PATENT AND TRADEMARK OFFICE
CERTIFICATE OF CORRECTION

PATENT NO. : 5,175,862

DATED : December 29, 1992

INVENTOR(S) : Andrew E. Phelps et al.

It is certified that error appears in the above-indentified patent and that said Letters Patent is hereby corrected as shown below:

Title page, item

[75] Inventors: Please delete "Eau claire" and insert --Eau Claire-- therefore.

Column 40, line 16, please delete "vector openand" and insert --vector operand--therefore.

Signed and Sealed this

Twentieth Day of February, 1996

Attest:

BRUCE LEHMAN

*Attesting Officer*

*Commissioner of Patents and Trademarks*